United States Patent [19]

Collins

[11] Patent Number: 4,797,589
[45] Date of Patent: Jan. 10, 1989

[54] DYNAMICALLY RECONFIGURABLE TIME-SPACE-TIME DIGITAL SWITCH AND NETWORK

[75] Inventor: Arthur A. Collins, Dallas, Tex.

[73] Assignee: Arthur A. Collins, Inc., Dallas, Tex.

[21] Appl. No.: 79,252

[22] Filed: Jul. 29, 1987

Related U.S. Application Data

[63] Continuation of Ser. No. 825,394, Feb. 3, 1986, Pat. No. 4,701,907.

[51] Int. Cl.⁴ ............................................. H04Q 11/04
[52] U.S. Cl. ......................................... 370/63; 370/86
[58] Field of Search ....................... 370/63, 86, 58, 64, 370/66, 59, 103; 340/825.05

[56] References Cited

U.S. PATENT DOCUMENTS

| | | | |
|---|---|---|---|
| 3,925,621 | 12/1975 | Collins et al. | 370/63 |
| 3,956,593 | 5/1976 | Collins et al. | 370/63 |
| 4,005,272 | 1/1977 | Collins et al. | 370/63 |
| 4,038,497 | 7/1977 | Collins et al. | 370/63 |
| 4,270,203 | 5/1981 | Collins et al. | 370/102 |
| 4,539,678 | 9/1985 | Ambroise et al. | 370/86 |
| 4,581,732 | 4/1986 | Boisseau et al. | 370/63 |
| 4,701,907 | 10/1987 | Collins | 370/63 |

Primary Examiner—Douglas W. Olms
Attorney, Agent, or Firm—Richards, Harris, Medlock & Andrews

[57] ABSTRACT

A dynamically reconfigurable time-space-time (DRTST) switching system for use in conjunction with a high speed transmission media which conveys a plurality of time division multiplex (TDM) channels within a repeated frame of data is provided. The system includes a bypass for selectively opening the transmission media. A control store is connected to the bypass for receiving selected channels, one of said selected channels comprising a control channel. A TST switch having a plurality of inlet ports and a plurality of outlet ports is provided wherein the inlet ports are connected to receive selected channels from the bypass, and the outlet ports are connected to the bypass for transferring data from the TST switch to the transmission media. The control store responds to commands received through the control channel for dynamically allocating active ones of the selected channels to respective inlet ports of the TST switch, for dynamically allocating receipt channels of the selected channels to the outlet ports and for routing the data from the active ones of the selected channels through the TST switch to a selected one of the outlet ports wherein the data for the active selected channel is returned to the transmission media to thereby accommodate various types of data.

3 Claims, 2 Drawing Sheets

DYNAMICALLY RECONFIGURABLE TIME-SPACE-TIME DIGITAL SWITCH AND NETWORK

RELATED APPLICATION

This application is a continuation of U.S. patent application Ser. No. 825,394, filed Feb, 3, 1986, now U.S. Pat. No. 4,701,907 and entitled: "Dynamically Reconfigurable Time-Space-Time Digital Switch and Network".

TECHNICAL FIELD

The present invention relates to telecommunications networks and in particular to a dynamically reconfigurable digital switch and associated network.

BACKGROUND OF TH EINVENTION

Time Space Time (TST) switches are a particularly useful configuration of switching elements providing both time and space translation between channels of Time Division Multiplexed (TDM) telecommunications transmission lines using lightwave transmission facilities. A TST switch interconnects digital bi-directional TDM communication lines with TDM communication involving the sharing of single transmission paths, individually, in time to provide multiple channels in a single transmission medium. This is a fundamental system improvement in telephone communications to reduce cost of ordinary telephone services, and in enhancing the ability to provide many new kinds of service, in meeting expanded communications needs.

Electromechanical crossbar and relay switching systems, as generally used today in telecommunications switching, have, for practical purposes, reached the limit of their capabilities. Extensive, continued adherence to these older technologies severely restricts capability, and greatly increases costs of telecommunication systems; and, particularly so with expansion to systems of great size and complexity. While many advances have been made in capability and efficiency in the transmission area, with microwave, satellite, and high-capacity cable, and with both analog and digital repeaters and terminals being used, the exchange plant, including switching equipment in central offices and branch exchanges, remain in essence the same as in the very early days. Recent advances in solid state technology make the use of all digital switching and transmission techniques more attractive today than ever before.

The advent of digital multiplex transmission systems gives rise to many possibilities; particularly with TDM multiplex terminals beginning to look like switches. Message signals in these terminals appear in "time slots," and transfer of signals between time slots is accomplished by a "time slot interchange," with time-division switches connected directly to multiplex transmission lines. Another important saving is accomplished through elimination of digital-to-analog, and analog-to-digital, conversions of every switchin. The existing local exchange area plant represents the major part of telephone plant investment, and the least efficient portion of the system—with large quantities of scarce materials required. Further, physical congestion problems are encountered with entrance cables as they approach the central office, and, many times, there are difficult growth problems in central office main distribution frames.

Present telephone central office switching includes bulky electromechanical switching stages located in large, costly building space. Costs for new construction and maintenance of such traditional exchange area plants are constantly increasing, particularly with large cable networks employed when cable pair utilization is inherently very low with a dedicated physical wire pair used to connect each subscriber station to its central office. Thus, system improvements attainable with time division transmission and switching techniques are very significant, and have resulted in the development of TST switches and systems described and claimed in, for example, U.S. Pat. Nos. 3,925,621; 3,956,593; 4,005,272; and 4,038,497.

The development of fiber optic lightwave transmission of information is a truly qualitative advance. The bandwidth limited channel capacity inherent in metallic media transmission has been removed. A single monomode optical fiber can carry many thousand distinct digital voice and data channels per fiber. Once a fiber optic cable is in place, increases in channel capacity are essentially cost free. At present, there is a belated effort to install digital switches an outmoded 1877 structural concept and obsolete 64-kb/s T1-D4 copper wire based carrier channels.

The telephone industry has been slow to adopt advanced technology concepts that would enhance the capacity, speed and usefulness of telephone networks to users. TST switches are coming into wider use in the telephone network, but full benefits of such switches have not been realized. In recent years fiber optic cable and equipment have been developed for commercial application. Fiber optic communications can make possible extremely high data transmission rates, greater than communication rates that can be achieved with present metallic conductors.

The present architecture of the telephone system does not fully exploit either the capabilities of digital TST switches or the enormous capacity of fiber optic communications. These two developments have dramatically changed the economics of the telephone network. However, development of new kinds of switches that will be required to selectively connect telephones, terminal stations and computers on demand thus making lightwave transmission facilities useful as a switched network has been lacking. Much more than one-for-one replacement of copper wire with glass fiber is required.

As a result of these developments there is a need for a telephone network architecture which can take advantage of the lower cost TST switches and the extremely high data transmission rates availability with fiber optic technology as well as improved TST switches.

The present invention is also of particular significance in view of the increasing use of digital transmission and switching in voice and data telecommunication networks and the need for accurate information transmission through these networks. Heretofore, digital transmission systems have relied on "pulse stuffing" techniques to ensure accurate transmission of information in a digital multiplex hierarchy.

Various approaches to network synchronization have been proposed to equalize clocks throughout a large network. One such approach is shown in U.S. Pat. No. 4,270,203. Master/slave arrangements are possible wherein, for example, a relatively expensive atomic standard is used as a clock source and other clocks are slaved to this master. Mutually synchronized clock systems have also been studied with individual clocks arranged in a manner that attempts to achieve an average network frequency based on information from each clock. The use of highly stable, independent clocks is yet another possibility. Even with these measures, it is not possible to completely control clock signals and synchronization errors will eventually occur. A need has thus arisen for an improved synchronization arrangement.

SUMMARY OF THE INVENTION

In accordance with one aspect of the present invention, a high speed digital switch is provided and comprises a unified multiplexing and switching structure that affords selective full access to all time division multiplex (TDM) channels transmitted via fiber optic cable or other TDM transmission media. The switch ports are serial-tap connected to fiber optic loops. A number of distributed switches are connected to a single loop, thus forming a switched multipoint ring. Selected channels can be "dropped/inserted" without disturbing other channels which bypass the switch. Although fiber optic cable can carry a very large number of channels, the switches are sized to serve only the reduced number of channels required at each switchpoint.

Several levels of switching are used in the local area distribution network with differing numbers of channels switched at each level.

The inlet data store port and the outlet data store port provide the time slot interchange function in the TST switch and are sized to store one frame of the reduced channel set, the fraction of the loop frame that will be accessed at one switch port.

Another aspect of the present invention allows the order of writing to the inlet data store and reading the outlet data store in a random order. The inlet and outlet data store locations are accessed under the control of cyclically read lists of addresses contained in control stores.

The present dynamically reconfigurable TST switch uses a bypass matrix at each port to open the loop so that data cannot recirculate across a node at which data is being extracted or inserted. This is desired when data is being moved from node to node for a two-node connection. In the multicast case the transmitting node inserts data which is monitored by all addressed nodes; data returned to the transmitting node is removed. The loop is never closed in a manner that permits new data to overwrite and thus corrupt old data.

The present invention further provides for timing adjustments necessary to maintain synchrony which are made during timing adjustment intervals. One or more such intervals are included in each frame. TDM channels are connected between nodes only when data is being transferred. A stable clock is used to maintain frame alignment during idle intervals occurring between transmission of timing signals. If the receiving channel is free, incoming calls are accepted and the loop is opened. If the TDM loop channel is free and an outgoing call is to be sent, the loop is seized for transmission. Again, the loop is opened and any incoming data is removed. Otherwise the loop remains open and an access control word (ACW) is extracted and re-inserted at the correct time to preserve TDM channel frame alignment.

The timing of ACW extraction and re-insertion is controlled by a programmable counter driven by the clock. The node that most recently released its connection to the loop is responsible for insuring that not more than one ACW is present while the loop is idle. The ACW serves as a "token" and also as a timing signal.

BRIEF DESCRIPTION OF THE DRAWINGS

For a more complete understanding of the present invention and the advantages thereof, reference is now made to the following Detailed Description taken in conjunction the accompanying Drawings in which.

DETAILED DESCRIPTION

As a preliminary step to describing the present dynamically reconfigurable time space time (DRTST) digital switch and network operation, a description of a basic TST switch and its operation is provided.

Figure 1:
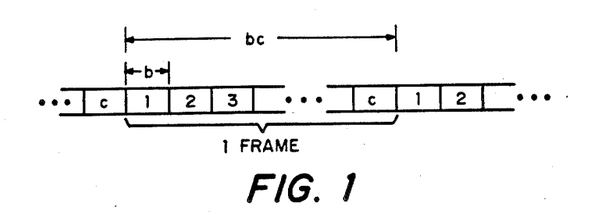
FIG. 1 represents a graphic illustration of a format for a time division multiplexed digital data stream comprising a plurality of repeated channels within a frame.

TST switches are designed to interconnect a number of digital Time Division Multiplex (TDM) communication lines with TDM lines involving the sharing of individual single transmission paths in time. The basic format of a time-divided transmission link is illustrated in FIG. 1. Time is divided into intervals with c intervals forming a frame. Each interval is defined as a channel, and a user of the link is allocated one channel. A link with an information rate of R bit/s consists of c channels, each of rate R/c. The individual channel intervals may be one or more bit intervals, b, in length. Each communication is allowed to send a single word of b bits per frame. For example, the T1 carrier system uses 8-bit intervals, interleaving the 8-bit representations of the voice signal samples. Twenty-four such intervals constitute a frame. The present invention provides a mechanism to allow the beginning of frames to be detected at receivers so that individual channels may be identified. This process is known as frame synchronization or framing and will be subsequently described with respect to FIG. 4.

In typical digital voice systems, 8-bit words are generated at an 8 KHz rate and, thereby, a pair of 1.536 mbps transmission links are capable of carrying 24 separate conversations. Similarly, an 8.192 mbps link could accommodate 128 64 kilobit per second channels. When such communication channels are switched from one TDM transmission link to another, both time and space transmission is required, such as illustrated in FIG. 2.

Figure 2:
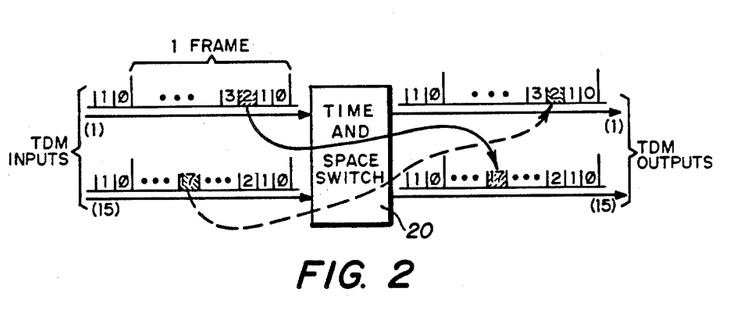
FIG. 2 a combination graphic and schematic block diagram showing a time division multiplexed input-output time and space switch unit.

Referring to FIG. 2, TDM inputs (1) and (15), of a plurality of input lines, are shown to feed time and space switch 20 with TDM outputs (1) and (15), of a plurality of output lines emanating therefrom. Channel 2 of the TDM input line (1) is connected to channel 17 of the TDM output line (15), and, with full duplex communication requiring a two-way circuit, a second connection path is established, as indicated by the dotted line, transferring channel 17 of TDM input line (15) to channel 2 of TDM output line (1). A procedure for operating a digital time division switch such that both connections are automatically established in one operation, with the second path a mirror image of the first path in a folded operation, and is described in greater detail of U.S. Pat. No. 4,005,272 and particularly, "time folded" operation for TST switches.

Figure 3:
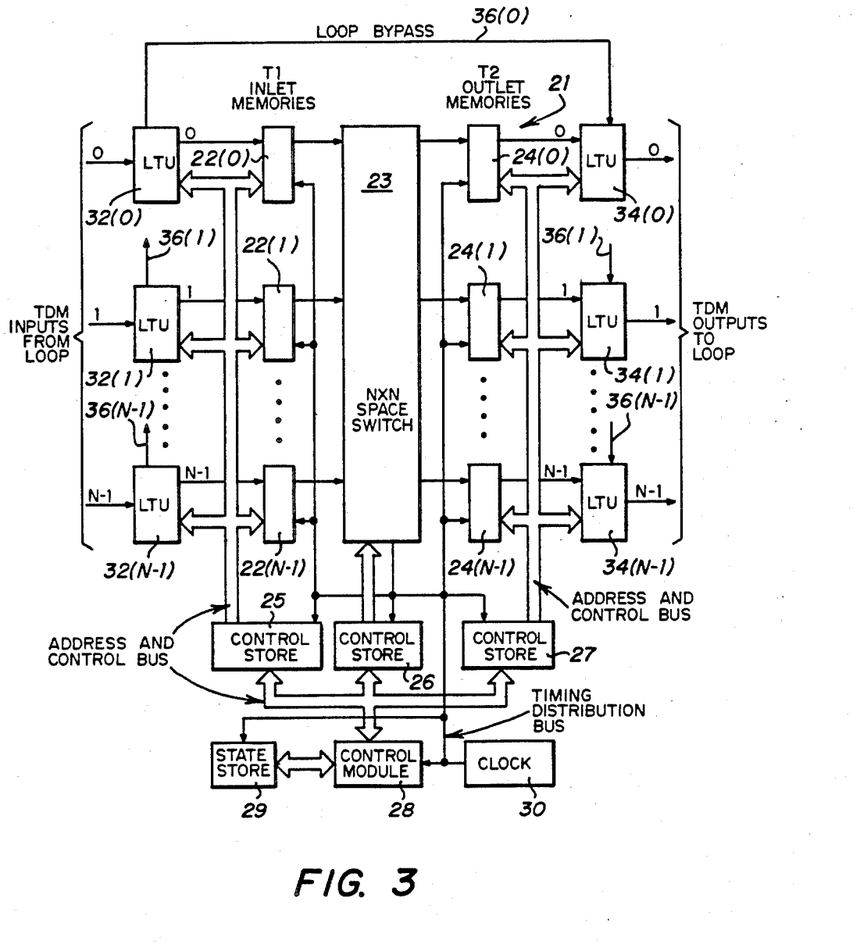
FIG. 3 is a schematic illustration of a dynamically reconfigurable TST digital switch configuration in accordance with the present invention.

A basic TST switch configuration 21 is shown in FIG. 3. The switch 21 terminates N bi-directional time-division links. Input memories are provided where received information is stored. Sufficient capacity is provided in a memory to accommodate one frame, with one word per channel being used to store the data. With c channels per frame, there will be c words per memory. Similar memories are provided on the output side of the switch. In accordance with the present invention, data is dynamically written randomly into the input memories and dynamically read randomly from the output memories with transfer between memories taking place via the middle space switching stage. This scheme is contrary to prior TST switches where data is written to the inlet memory and read from the outlet memory sequentially. With N bi-directional links, there will be 2N memories. If a square switching array is used, the switch will require $N^2$ crosspoints.

The first stage T1 of the switch 21 has N inlet memories (actually 0 through N−1) 22(0), 22(1) . . . 22(N−1) one for each of the 0 through N−1 TDM inputs, respectively. The c channel words from each input are stored in c addresses of the respective inlet memories with these words then held in the memories until they are transferred through the space switch 23 to the outlet memories 24(0), 24(1) . . . 24(N−1) in the third stage T2, space switch 23 actually being the second stage, where the words are held in outlet memories until they are released on respective 0 through N−1 output TDM lines. Hence, the first stage represents a time switch in that data occurring in the input channels is translated in time to a time slot during which the space switch 23 transfer takes place. The T2 outlet memories 24(0), 24(1) . . . 24(N−1) receive data words from space switch 23 and store them in addresses corresponding to the desired output channel with the time division outputs 0 through N−1 then obtaining their data by locations of respective outlet memories being addressed.

Therefore, the order of writing to the inlet memory and reading the outlet memory is done in a random order.

The inlet data store stage and the outlet data store stage provide the time slot interchange function and are sized to store one frame of the reduced channel set which is the fraction of the loop frame, if the data passes through a multiplexer, that will be accessed at one switch port N. The frame size associated with each switch port is fixed, but in accordance with the present invention, different frame sizes can be assigned to each port of switch 21.

Associated with each inlet memory, space switch stage output, and outlet memory, is a control memory that contains words corresponding to the number of time slots during which data is transferred through the space stage 23. The individual control memories may be separate, one for each inlet and outlet port or may be collected together in control stores such as control stores 25, 26, and 27, for the T1 inlet memories, the space switch 23 stage outputs, and the T2 outlet memories, respectively. The control stores 25, 26, and 27, specify which space switc crosspoints are selected and which inlet and outlet memory port locations are accessed during each switch time slot, with the control stores being accessed in cyclic fashion so that each connection is repeated, at the same time, during every frame. The control stores may be programmed to provide for dynamic reconfiguration of switch 21. Address and control information is transferred from the control memories for each call in progress to the inlet and outlet memories and between the control stores and the control module 28 via the address and control buses, as indicated in FIG. 3.

Establishing a connection through a TST switch, from a selected inlet memory to a selected outlet memory, involves finding a time slot during which the selected inlet memory, the selected outlet memory, and an appropriate space path are idle. Thus, the pathfinding operation in a TST switch involves a time search as well as a space search. The space switch connections are time division multiplexed.

The control module 28 sets up and takes down connections in response to requests and disconnects, acting through the control stores 25, 26, and 27. In setting up calls, the control module 28 accesses state store 29, that stores the status of every switching element during every switch time slot, to determine idle switching paths and available time slots. The state store 29 contains the busy/idle status of all memory locations and space switch paths for each of the switch time slots. This state information is used in setting up new calls through the system. Then, when an idle path is found, the corresponding state store bits are set to "busy" and the appropriate information is loaded into the control stores. When discontinuing a connection, the control stores are accessed to determine which state store bits must be set to idle.

Although FIG. 3 shows the state store 29 as being distinct from the control store 25, in some implementations it is desirable to incorporate both functions into one piece of equipment. In these instances the control information and the status of the respective switching element can be obtained by a single access to one device. Master clock is distributed to all switching elements, as indicated by the timing distribution bus from master clock source 30. Thus, the NXN space switch 23 that, in FIG. 3, is a square switch with an equal number of input and outputs, is operated in time divided fashion in synchronous with the time stages. This is with all operations cyclic, so that data occurring in each time slot of successive incoming frames is transferred to the same time slot (channel) of successive outgoing frames.

A pair of inlet and outlet line terminating units (LTU) 32 (0)-(N−1) and 34 (0)-(N−1) are associated with each loop-connected switch port. LTUs are provided with a normally closed bypass gate 36 that permits signals to flow directly from the inlet side 32 to the outlet side 34 of the line terminating units without traversing the switch 23 itself. Thus signals are free to circulate around the loop past all idle switch ports. A connection is made between two ports when their bypass gates are opened. This gate action separates the loop into two paths to form a bidirectional, full-duplex connection between two nodes. The bypass gates on all other loop ports remain closed so that only two switch ports are connected.

The inlet and outlet line terminating units 32 and 34 provide multiplex, timing, and control interfaces between the connected links and the inlet and outlet data stores. These units also allow bypassing the switch through the loop bypass. The loop bypass 36 allows data circulating on a loop to completely bypass a switching node for which the data is not intended. Data that is intended for the node is routed through the switch 23. The data taken off the loop by the inlet line terminating unit 32 is replaced with the correspoinding output data from the outlet time slot on a loop to be used for simultaneous 2-way communication without idle time on the time slot. Line terminating units 32 and 34 for loops designed with modern solid-state circuits are capable of providing the economical realization of several desirable operational features:

(1) Decentralized time-division multiplexing (2) High-speed control with distributed "hard-wired" logic used to perform loop switching functions and to reduce the loading and critical reliance on connected TST switches and their associated processors.

(3) Operation as regenerative repeaters for circulating loop signals to expand the cable capacity. The use of serial line connections eliminates pulse distortion problems often encountered with parallel line connections.

Each LTU 32 and 34 further includes a sequential decoder/encoder and a bypass matrix. The sequential decoder/encoder is a logic circuit used in the DRTST switch 21 that monitors all signals on high speed loop channels operating in block mode and decodes access control words (ACWs) that arrive as preambles on each block. The following codes and parameters are derived and output: start, loop channel free/busy status, frame clock, timing adjustment, address/control, connect code. The encoder part of the circuit inserts corresponding signals and codes for return transmission to the source node. The circuit includes addressable registers accessed by an associated microprocessor controller. The decoded variables in the incoming ACW are output sequentially with minimum delay.

The bypass matrix within each LTU 32 and 34 is a small, coordinate switch matrix placed in the serial loop tap clocked by the switch clock 30 and controlled by a programmable counter and the control stores 25, 26, 27 associated with a switch port. The matrix is capable of selecting single time-adjacent pulses transmitted at fiber optic cable speeds (1–2 ns pulses). The following connections are made through the matrix: (1) bypass the port, (2) connect the port inlet and outlet in series with the loop, (3) cross the bi-directional loop for transfer of ACW timing adjustment codes returned from a receiving node to a sending node, (4) loop-back connection for cable testing. The cross-connect function (3) is not used when unidirectional cables are not placed in the same duct; the address decoding function of the sequential decoder/encoder is used instead to return timing adjustment signals to the selected node.

The loop transmission medium and the serial connected line terminating units 32 and 34 can be viewed as a circulating end-around shift register with storage elements comprised of the internal storage delays of the individual line terminating units and of the propogation delay of the transmission medium. The total loop delay is the sum of these components. When multiplex loop channels are used with switch 21, a self-clocked first-in-first-out (FIFO) elastic buffer is included within each LTU 32 and 34 to maintain the correct value of the delay which receives the ACW timing adjustment code.

Each LTU 32 and 34 further includes a receiver and transmitter used in connection with the feedback signal to provide an input to the elastic buffer for synchronization.

Figure 4:
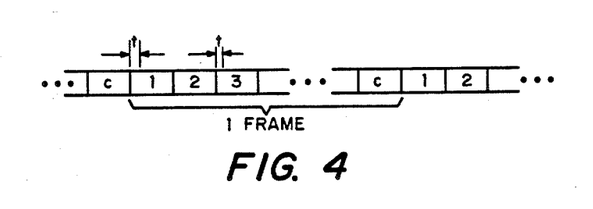
FIG. 4 is a graphic illustration of a time division multiplexed data stream comprising a plurality of repeated channels within a repeated frame with each frame including a timing adjustment interval in accordance with the present invention.

Referring simultaneously to FIGS. 3 and 4, the frame synchronization aspect of the present invention will now be described. The synchronization system is an important feature of the present digital network concept that contributes to its generality and flexibility. An indefinitely extended network can be formed with an arbitrary number of loops and meshes. A special kind of phase locked loop feedback signal formed with high precision fractional dividers is used to synthesize switch clock frequencies and to independently clock data transfers on each connecting link. Adaptive correction is made for crystal oscillator frequency offsets, doppler shift due to cable temperature changes and relative motion of mobile stations. Only the small elastic buffers within LTUs 32 and 34 are required and these are not allowed to overflow or underflow, hence there are no slips that cause loss or duplication of data.

As shown in FIG. 4, each frame includes one or more channels having a timing adjustment interval, t. LTUs 32 and 34 include programmable multiple rate counters. These counters are digital counters having carry logic and a register that provides for varying the modulus of each bit position to provide counting rates throughout the complete counting cycle. Such programmable counters are used to address at the appropriate rate the multiplex channels in a frame. The timing adjustment intervals are included at defined positions in the frame counting cycle. The duration of each interval is controlled by a variable rate precision fractional oscillator or programmable fractional divider associated with each LTU 32 and 34. The divider in turn maintains synchrony in the presence of timing variations within the network. More specifically, the divider comprises a variable modulus counter having a programmable register that controls the value of the modulus used in the digital switch in connection with the feedback signal, access control word. The counter within an output LTU provides feedback signal to a divider in an input LTU to adjust the timing adjustment interval.

Figure 5:
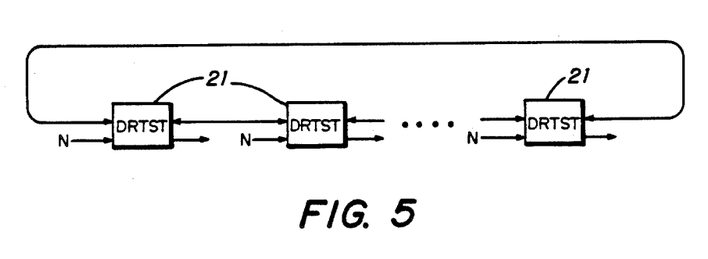
FIG. 5 is a schematic illustration of a TDM communication loop having a plurality of dynamically reconfigurable TST digital switches connected to show the loop structure of the present system.

Referring now to FIG. 5, a bi-directionally loop connected network is illustrated using the present DRTST 21. Data is extracted from or inserted to the loop when the loop is open. This configuration allows data to flow around the loop past idle switch ports.

The advantages of the present TST switch and network is telephone systems using fiber optic transmission media are numerous. Although not exhaustive some of these advantages include:

(1) The internal operation of switches, digital telephone, and all other nodal elements of the network are controlled by microprocessors operated under higher level control of common control computer centers. This is a distinct departure from the conventional practice where every switch is equipped with duplicate, costly stored program computers capable of handling both simple and complex control functions and maintaining a large data base. Separation of the switching and control equipment permits the use of miniaturized, microprocessor controlled switches.

(2) Reliability is greatly increased by use of shared common control computer centers. In these centers groups of computers are organized for shared use with the processing load distributed across the groups.

Should one computer fail, another can take over its function.

(3) The virtually cost free added channel capacity of fiber optic cable can be used to physically separate the traffic carrying switches from the shared control centers. Indeed, unattended, remote control and automatic operation can be used. The use of fiber optic rings connected to digital switches increases network connectivity in some cases by orders of magnitude. This greatly increases the number of ways calls can be routed through the network and tends to reduce the number of switches required for an end-to-end connection.

(4) The average size of the switches tends to be reduced because switches are sized to handle only the reduced number of channels required for traffic connections at specific nodes and need not switch through traffic that can bypass the switch. This feature is especially useful in long haul routes because intermediate waypoints can be served with small switches that add little switching equipment cost.

(5) The properties of a ring-switched network also can be exploited to reduce the cost of local area coverage and to avoid routing traffic through large central offices. The need is eliminated for large buildings to house bulky switches, separate multiplexing hardware, large distribution frames and large entrance cable vaults.

(6) Networks of any size including worldwide networks can be formed in this manner using a combination of fiber optic, radio and satellite transmission media. The homogeneity and versatility of the present network makes invalid the current distinction between local and long distance networks.

(7) The same equipment is used for both voice and data in contrast to conventional packet switching that requires separate equipment for data service. More efficient data transmission at medium and high speeds is provided while reducing the cost of ordinary telephone service. This meets known market demands and avoids the risks of offering specialized premium cost service that may not be accepted in the marketplace.

(8) TDM channels are connected and held for ordinary voice (point-to-point) and conference (multipoint) calls. The same connection modes are used to form virtual connections for shared channel data traffic and for multicast traffic.

(9) Channels are assigned as trunk groups under common channel control. Virtual multipoint connections are used for the common control channels. Block mode control messages transmitted to switches via common control channels are processed by a microprocessor that updates control stores and completes simple local switching functions. More complex functions such as providing directory service and computing routing vectors are handled by remote, higher level common control computers connected via multipoint subnetworks.

(10) Common channel block mode control is extended to digital telephones and other end devices. This provides continuous, orthogonal control to all network elements.

(11) The ability to randomly read and write to the switch memories provides for a new data traffic routing concept making use of switched multipoint subnetworks connected through digital switches to conform to dynamically changing traffic patterns having a high community of interest. This organization concentrates data traffic generated to all subnetwork stations and computers in a form that can be carried efficiently by the main network while reducing, instead of increasing, the load on main network control processors. In this way, fiber optic cables, time division multiplexed transmission, digital switches and switched multipoint subnetworks are combined to form distributed systems with the freedom to place computers of the required size at points in the network where they will be most effective. This freedom is important in the placement of the common control computers of the main network and also in the organization and placement of user's computers.

(12) Data handling capability is increased by using miniature terminal switches at stations and computers, not by encumbering the transmission and switching elements of the main network with the complexity resulting from addition of new service features. New features are added at or near the point of use as they are needed. Control of the main network is simplified.

(13) In the main network it is cost effective to use digital switches to form network connections that may be held for long intervals, in some cases, days or months. The low incremental cost incurred by increasing switch capacity to terminate all operational transmission channel groups is exploited to reduce or eliminate the use of non-switched leased lines. Telephone companies benefit by eliminating costly distribution frames. The same operating procedures can be used for all connected circuits. Higher quality of service is assured to users by the in-service performance monitoring and by fast restoration of service via alternate routes characteristic of switched networks.

(14) The common control system does not rely on large multiprogrammed mainframes to expand computer system capacity. Instead, multiple computers are operated as multiprocessor groups. Groups can be formed using only 32-bit supermicrocomputer units. Alternatively, a mix of computer units ranging in size from supermicrocomputers to very large super computers and scaler, vector and specialized machine types can be included. The high speed data transfer capability of the switched network makes it possible to include distant computers as members of a processor group.

(15) Jobs and tasks are dispatched to available members of a processor group in a manner analogous to that used for communication trunk groups. Thus, it is useful to view the system as a switched network of transmission, storage and processing "channels." A high degree of processing concurrency is realized by a simple dispatching discipline without encountering the difficulties of uncovering hidden concurrencies at the machine instruction level. A long standing problem that has retarded development of multirocessing systems is simply avoided.

(16) Multipoint subnetworks connected through digital switching modules are used to integrate voice and data service in a common digital circuit switched network. Switched subnetworks are formed by equipping data stations with small terminal switches connected to the main network. Switches placed at I/O ports within a computer system can handle both intra-site traffic and wide area switched multipoint subnetworks. Main network connections serve as direct data transmission trunks for the subnetworks.

(17) The increased call processing requirements of data traffic are handled at the points where they arise, that is, at the terminal switches. The call processing load of the main network is reduced rather than increased. Main network costs are reduced by using switched circuits instead of non-switched circuits because a modern digital switch provides both multiplexing and switching functions at equal or less cost than multiplex-only equipment. Rearrangement and testing costs for non-switched circuits are eliminated. All of these factors contribute to a substantial overall reduction in cost of supplying service.

(18) With great freedom and flexibility users can set up at will the data communication capabilities they require. All of the service qualities, universal access and continuity of service assurance of the main network apply also to subnetworks. User data traffic is concentrated on main network circuits permitting high utilization and lower traffic unit cost. The combination of the present DRTST switched subnetworks, and DRTST switches provides an efficient way to integrate voice, data and many other kinds of service in a digital switched network.

Whereas, the present invention has been described with respect to specific embodiments thereof, it will be understood that various changes and modifications will be suggested to one skilled in the art and it is intended to encompass such changes and modifications as fall within the scope of the appended claims.

I claim:

1. A dynamically reconfigurable time-spacetime (DRTST) switching system for use in conjunction with a high speed transmission media which conveys a plurality of time division multiplex (TDM) channels within a repeated frame of data, comprising:

a bypass for selectively accessing said transmission media for extracting data from channels and inserting data into channels;

a control store connected to said bypass for receiving a variable number of dynamically selected channels from the plurality of channels, one or more of said selected channels comprising a control channel;

a time-space-time (TST) switch having a space switch including a plurality of inlet ports and a plurality of outlet ports each having a memory;

said bypass having a plurality of inlet line terminating units and a plurality of outlet line terminating units, said inlet line terminating units connected to receive selected channels from said transmission media for transferring data to said TST switch, said outlet line terminating units connected to transfer data from said TST switch to said transmission media;

said inlet line terminating units selectively passing ones of said channels to said TST switch and the remaining ones of said channels of said frame to said outlet line terminating units thereby selectively reducing the frame size of said transmission media transmitted to said TST switch, said outlet line terminating units restoring said reduced frame size to its oriqinal size;

said inlet ports of said TST switch being connected to randomly receive channels from said inlet line terminating units, said outlet ports of said TST switch being connected to randomly transmit channels from said outlet ports to said outlet line terminating units for transferring data from said TST switch to said transmission media, ones of said inlet ports and outlet ports receiving frames of variable sizes determined by said control store; and said control store responding to commands received through said control channels for dynamically allocating active ones of said selected channels to respective inlet ports of said TST switch, and for dynamically allocating received channels of said selected channels to active ones of said outlet ports of said TST switch and further for routing the data from said active ones of said selected channels through said TST switch to a selected active one of said outlet ports wherein said data for said active selected channel is returned to said transmission media to thereby accommodate various types of data.

2. The switching system of claim 1 wherein said transmission media comprises a optic cable.

3. The switching system of claim 1 wherein said inlet ports and said outlet ports of said TST switch have different memory capacity corresponding to a predetermined size of said reduced frame size necessary to accommodate individual switch ports.

* * * * *

REEXAMINATION CERTIFICATE (4637th)

United States Patent
Collins (10) Number: US 4,797,589 C1
(45) Certificate Issued: Sep. 10, 2002

(54) DYNAMICALLY RECONFIGURABLE TIME-SPACE-TIME DIGITAL SWITCH AND NETWORK

(75) Inventor: Arthur A. Collins, Dallas, TX (US)

(73) Assignees: Mary Collins; Alan A. Collins

Reexamination Request:
No. 90/005,934, Feb. 21, 2001

Reexamination Certificate for:
Patent No.: 4,797,589
Issued: Jan. 10, 1989
Appl. No.: 07/079,252
Filed: Jul. 29, 1987

Related U.S. Application Data (63) Continuation of application No. 06/825,394, filed on Feb. 3, 1986, now Pat. No. 4,701,907.

(51) Int. Cl.[7] ............................................. H04Q 11/04
(52) U.S. Cl. ........................ 359/117; 370/370; 370/371
(58) Field of Search ................................ 370/369, 370, 370/380, 371

(56) References Cited

U.S. PATENT DOCUMENTS

| | | |
|---|---|---|
| 3,659,271 A | 4/1972 | Collins et al. |
| 3,823,401 A | 7/1974 | Berg et al. |
| 3,824,597 A | 7/1974 | Berg |
| 3,925,621 A | 12/1975 | Collins et al. |
| 3,956,593 A | 5/1976 | Collins et al. |
| 4,005,272 A | 1/1977 | Collins et al. |
| 4,038,497 A | 7/1977 | Collins et al. |
| 4,270,203 A | 5/1981 | Collins et al. |
| 4,460,994 A | 7/1984 | Scanlon et al. |
| 4,667,324 A | 5/1987 | Graves |
| 4,716,561 A | 12/1987 | Angell et al. |
| 4,764,921 A | 8/1988 | Graves et al. |

OTHER PUBLICATIONS

Arthur A. Collins and Robert D. Pedersen, "Telecommunications: A Time for Innovation," 1973.
John Bellamy, "Digital Telphony," 1982.
Publication T1X1.4/85–005.
Publication T1X1.4/85–006.
Publication T1X1.4/85–007.
Publication T1X1.4/85–018.
Publication T1X1.4/85–020.
Publication T1X1.4/85–036.
Publication T1X1.4/85–050.
Publication T1X1.4/85–053.
Publication T1X1. 4/85–054.
Publication T1X1. 4/86–013.
Publication T1X1. 4/86–019.
Publication T1X1.4/86–022.
C–System General Description, Document No. 523–0561697–20173R, Collins Radio Company, Dallas, Texas, May 1, 1970.

(List continued on next page.)

*Primary Examiner*—Salvatore Cangialosi (57) ABSTRACT

A dynamically reconfigurable time-space-time (DRTST) switching system for use in conjunction with a high speed transmission media which conveys a plurality of time division multiplex (TDM) channels within a repeated frame of data is provided. The system includes a bypass for selectively opening the transmission media. A control store is connected to the bypass for receiving selected channels, one of said selected channels comprising a control channel. A TST switch having a plurality of inlet ports and a plurality of outlet ports is provided wherein the inlet ports are connected to receive selected channels from the bypass, and the outlet ports are connected to the bypass for transferring data from the TST switch to the transmission media. The control store responds to commands received through the control channel for dynamically allocating active ones of the selected channels to respective inlet ports of the TST switch, for dynamically allocating receipt channels of the selected channels to the outlet ports and for routing the data from the active ones of the selected channels through the TST switch to a selected one of the outlet ports wherein the data for the active selected channel is returned to the transmission media to thereby accommodate various types of data.

OTHER PUBLICATIONS

J.R. Pierce, "Network for Block Switching of Data," The Bell System Technical Journal, vol. 51, No. 6, Jul.–Aug. 1972.

J.R. Pierce, "Synchronizing Digital Networks," The Bell System Technical Journal, vol. 48, No. 3, Mar. 1969.

T. Wakabayashi et al., "A Synchronous DS3 Add/drop Multiplexer With Cross–connect", IEEE Global Telecommunications Conference, Conference Record, vol. 2 of 3, Houston, TX, Dec. 1–4, 1986, pp. 1195–1199.

R. Ballart et al., "Restructured DS3 Format For Synchronous Transmission (SYNTRAN)", IEEE Global Telecommunications Conference, Conference Record, vol. 2 of 3, Atlanta, GA, Nov. 26–29, 1984, pp. 1036–1042.

M.W. Harvey et al., "Network Planning For The Syntran Add/Drop Multiplex (ADM)", IEEE Global Telecommunications Conference, Conference Record, vol. 3 of 3, Houston, TX, Dec. 1–4, 1986, pp. 1605–1609.

R. Ballart et al., "Synchronous Transmission at DS3", Telephony, vol. 211, No. 26, Dec. 29, 1986, pp. 36, 40–42.

J.M. Ryzdak, "Operations Planning For Synchronous DS3 Transmission", IEEE International Conference on Communications, Conference Record, vol. 1 of 3, Chicago, IL, Jun. 23–26, 1985, pp. 152–156.

G.R. Ritchie, "Syntran—a New Direction For Digital Transmission Terminals", IEEE Communications Magazine, vol. 23, No. 11, Nov. 1985, pp. 20–25.

R. Maruta et al., "On a Design Method for Frame Sync Stabilizers", Electronics and Communications in Japan, vol. 56, No. 1, 1973, pp. 9–18.

K. Ishii et al., "Digital Data Multiplexers for Datran Network", NEC Research & Development, No. 36, Jan. 1975.

F.T. Chen et al., "The Datran Network: System Description", National Telecommunications Conference, Conference Record, vol. 1, New Orleans, IO, Dec. 1–3, 1975, pp. 15–1—15–4.

Boehm, et al., SONET (Synchronous Optical Network), Globecom '85, Dec. 2–5, 1985, pp. 1443–1450.

T. Randall et al., "Datran's Time Division Data Switching System", National Telecommunications Conference, Conference Record, vol. 1, New Orleans, LO, Dec. 1–3, 1975, pp. 15–17—15–21.

R.L. Mitchell et al., "The Datran Microwave Radio System", National Telecommunications Conferenence, Conference Record, vol. 1, New Orleans, LO, Dec. 1–3, 1975, pp. 15–22—15–16.

F.T. Chen et al., "Timing Synchronization of the Datran Digital Data Network," National Telecommunications Conference, Conference Record, vol. 1, New Orleans, LO, Dec. 1–3, 1975, pp. 15–12—15–16.

F.T. Chen, "Digital Multiplexing Hierarchy for an Integrated Data Transmission and Switching System," National Telecommunications Conference, Conference Record, vol. 1, New Orleans, LO, Dec. 1–3, 1975, pp. 15–5—15–11.

J. Olsen et al., "The DATRAN Fault Alarm and Control System," National Telecommunications Conference, Conference Record, vol. 1, New Orleans, LO, Dec. 1–3, 1975, pp. 15–27—15–30.

E. Bondurant, "An Evaluation of Synchronization Methods for the DATRAN System," 7th International Conference on Communications, New York, NY, 1971.

J. Eger, "An Epitaph for Datran," Datamation, Dec., 1976 at p. 199.

A. Worley, "The Datran System," Proceedings for the IEEE, Special Issue on Computer Communications, Nov. 1972, pp. 1357–1368.

N. Tokura et al., "High–Reliability 100–Mbit/s Optical Accessing Loop Network System: OPALnet–II," Journal of Lightwave Technology, vol. LT–3, No. 3, Jun. 1985.

B.G. Lee et al., "Broadband Telecommunications Technology", Artech House, 1993.

U. Black, "Emerging Communications Technologies," Prentice Hall, 1994.

W.J. Goralski, "SONET—A Guide to Synchronous Optical Networks", McGraw Hill, 1997.

Kasson et al., "The CBX–II Switching Architecture," Selected Areas on Communications, Jul. 1985, p. 555.

Bux et al., "Architecture and Design of a Reliable Token Ring," IEEE Selected Areas on Communications, Nov. 1983, p. 756.

Huber et al., "Silk: An Implementation of a Buffer Insertion Ring," IEEE Selected Areas on Communications, Nov. 1983, p. 766.

Hopper et al., "Design of an Inegrated Cambridge Ring," IEEE Selected Areas on Communications, Nov. 1983, pp. 775–784.

Tokura et al., "OPALnet II," Proceeding of Globecom '84, Nov. 1984, paper 2.6.

Hafner et al., "A Digital Loop Communications System," IEEE Communications Technology, Jun. 1974, p. 877.

"Integrated Subsystem for High Speed Rate Local Area Networks," Proceedings of EFOC/LAN, Montreux, Switzerland, Jun., 1985, pp. 156–162.

J. Spilker, "Communications by Satellite," Telecom Library, 1977.

Contribution T1X1.4/84–021; Working Group T1X1.4 entitled "Response to Issues Raised Regarding the Bellcore Synchronous DS3 Format Proposal"; submission of Bell Communications Research; Oct. 22, 1984.

Publication T1X1.4/86–023, Recommendations for SONET Payload Mappings, Feb. 14, 1986.

"Synchronous DS3 Add–Drop Multiplex (ADM3/x) Requirements and Objectives", Bell Communication Research paper TA–TSY–0000010; Issue 2, (pp 1–122 and 10 figs.) Jun. 1985.

"Synchronous DS3 Digital Cross–Connect System (DCS3/x) Generic Requirements", Bell Communications Research paper TA–TSY–000233, Issue 1, (pp 1–122 and 10 figs.) May 1985.

"Synchronous Optical Networks (SONET)", Bell Communications Research paper TA–TSY–000253, Issue 1; part 1, "Concept" (pp 1–26 and 23 figs.) And part 2, "Frame" (pp 1–6, 2 figs.); Apr. 1, 1985.

"Synchronous Optical Network (SONET) Frame Proposal"; T1X1.4/85–006 (pp 1–6, 2 figs.); Feb. 27, 1985.

"Recommendations of AD HOC Group on Overhead Structure" with attached memo to Dr. Yau Ching from Kevin Pickles, Oct. 3, 1985.

"SONET: Now It's the Standard Optical Network", IEEE Communications Magazine, (pp. 8–15) Mar. 1989.

Schaefer, M.S., "Synchronous Optical Transmission for the Metrobus Lightwave Network", (AT&T Bell Laboratories Ward Hill, MA 01830) 30B 1.1–30B 1.5. 1987.

"Transmission Systems for Communications" Member of the Technical Staff Bell Telephone Laboratories, (Fifth Edition—Bell Telephone Laboratories, Incorporated) pp. 589–606, Ch 27. Introduction to Digital Transmission, 1982.

"Transmission Systems for Communications" Member of the Technical Staff Bell Telephone Laboratories, (Fifth Edition—Bell Telephoone Laboratories Incorporated) pp. 671–702 Ch. 29. Digital Multiplexers, 1982.

Pedersen, R.D. et al., "Digital Switched Networks" A Presentation to the National Electronic Conference New Technology Seminar Electronic Switching Systems—Digital. Oct. 1974.

Witt, F.J, "An Experimental 224 Mb/s Digital Multiplexer–Demultiplexer Using Pulse Stuffing Synchronization", The Bell System Technical Journal, Nov. 1965, pp. 1843–1885 (Manuscript Received Jul. 27, 1965).

Butman, S., "Synchronization of PCM Channels by the Method of Word Stuffing", IEEE Transactions on Communication Technology, vol. COM–16, No. 2, Apr. 1968, pp. 252–254.

Johannes, V.I. et al., "Multiplexing of Asynchronous Digital Signals Using Pulse Stuffing with Added–Bit Signaling", IEEE Transactions On Communication Technology, vol. COM–14, No. 5, Oct. 1968, pp. 562–568.

Abate, J.E. et al., "Keeping the Intergrated Services Digital Network in Sync", Bell Laboratories Record, Sep. 1981, pp. 217–220.

Publication T1X1.4/84–012, "Digital Network Standards Study–Evaluation of Bellcore Proposal" (Aug. 1984). M. Green.

Publication T1X1.4/84–007, "Consideration Affecting Synchronous DS3 Format Standard" (Aug. 20, 1984) AT&T Communications.

Publication T1X1.4/484–02, "Synchronous DS–3 Format" No Date.

ECSA Technical Subcommittee T1X1 Working Group T1X1.4, "Proposal for Transmitting Asynchronous DS–1 Signal in the Syntran Format" (Dec. 1984) Northern Telecom.

Publication T1X1.4/85–017, "Rates and Formats for Fiber Optic Network Interfaces" (May 15, 1985).

Publication T1X1.4/85–034, "Southwestern Bell Telephone Views on the SONET Proposal" (Jul. 19, 1985) Southwestern Bell Telephone Company.

Publication T1X1.4/85–049, "Telecommunications Committee T1—Digital Network Hierarchy Rates and Formats" (Aug. 14, 1985).

Publication T1X1/85–074, "Telecommunications Committee T1 Digital Network Hierarchy Rates and Formats" (Nov. 6, 1985).

Publication T1X1/85–069, "Meeting Minutes—T1—Telecommunications T1X1, Carrier/Carrier Technical Subcommittee" (Nov. 7, 1985).

Publication T1X1.4/85–000, "Digital Hierarchical Rates and Formats" (Nov. 8, 1985).

Publication T1X1.4/85–052, "Conclusions of T1X1.4 Sub-working Group on 64CCC" (Nov. 5, 1985).

Publication T1X1.2/.4 85–, "SONET STS–1 Frame Structure" (Nov. 5, 1985) Rockwell International.

T1X1.4/86–020, "Rates and Formats for Fiber Optic Interfaces" (Feb. 14, 1986) Bell Communications Research, Inc.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–3 is confirmed.

New claims 4–14 are added and determined to be patentable.

4. *A dynamically reconfigurable time-space-time (DRTST) switching system for use in conjunction with a high speed transmission media which conveys a plurality of time division multiplex (TDM) channels within a repeated frame of data, comprising:*
   *a bypass for selectively accessing said transmission media for extracting data from channels and inserting data into channels;*
   *a control store operatively connected to said bypass for controlling selection of channels from said transmission media so that said bypass receives a variable number of dynamically selected channels from the plurality of channels, one or more of said selected channels comprising a control channel for updating said control store;*
   *a time-space-time (TST) switch having a space switch including a plurality of inlet ports and a plurality of outlet ports each having a memory;*
   *said bypass having a plurality of inlet line terminating units and a plurality of outlet line terminating units, said inlet line terminating units operatively connected to receive selected channels from said transmission media for transferring data to said TST switch, said outlet line terminating units operatively connected to transfer data from said TST switch to said transmission media;*
   *said inlet line terminating units selectively passing ones of said channels to said TST switch and the remaining ones of said channels of said frame to said outlet line terminating units thereby selectively reducing the frame size of said selected channels from said transmission media transmitted to said TST switch, said outlet line terminating units restoring said reduced frame size to its original size;*
   *said inlet ports of said TST switch being operatively connected to randomly receive channels from said inlet line terminating units, said outlet ports of said TST switch being operatively connected to randomly transmit channels from said outlet ports to said outlet line terminating units for transferring data from said TST switch to said transmission media, ones of said inlet ports and outlet ports receiving frames of variable sizes based on the number of said selected channels as determined by said control store; and*
   *said control store responding to commands received through said control channels for dynamically allocating active ones of said selected channels to respective inlet ports of said TST switch for transferring data to said TST switch, and for dynamically allocating received channels of said selected channels to active ones of said outlet ports of said TST switch for transferring data from said TST switch and further, based on said allocations, for routing the data from said active ones of said selected channels in successive repeated frames of data through said TST switch to a selected active one of said outlet ports wherein said data transferred from said TST switch for said active selected channel is returned to said transmission media to thereby accommodate various types of data.*

5. *The switching system of claim 4 wherein said transmission media comprises a fiber optic cable.*

6. *The switching system of claim 4 wherein the DRTST switching system is one of a number of distributed switching systems communicating with said transmission media to form a switched multipoint ring network wherein selected channels may be dropped and inserted at a switching system without disturbing other channels which bypass that switching system.*

7. *The switching system of claim 6 wherein said line terminating units are separate from said TST switch and further comprise high-speed control with distributed logic to perform ring network switching operations, said high speed logic being separate from the TST switches and their associated processors.*

8. *The switching system of claim 7 wherein selected data that is dropped at a given node may also bypass said given node.*

9. *The switching system of claim 8 comprising a separate control store for controlling internal TST switch path connections, said separate control store being updated using information based on routing vectors from common control computers, said information being received from communication subnetworks.*

10. *The switching system of claim 6 wherein said repeated frame of data comprises a variable duration timing adjustment interval at a defined position in the frame counting cycle.*

11. *The switching system of claim 10 wherein the duration of said timing adjustment interval is controlled to vary in synchronism with timing variations within said switched multipoint ring network.*

12. *The switching system of claim 11 and further comprising circulating, end-around feedback control signals passed from said outlet line terminating units of the switching system to the inlet line terminating units of successive, adjacent, downstream switching systems in said ring network to control the duration of said timing adjustment interval to accommodate network timing variations.*

13. *The switching system of claim 4 wherein transmssion media channels are assigned as trunk groups under common channel control.*

14. *The switching system of claim 6 wherein network connections may be held for long periods of times forming virtual subnetworks connected to accommodate multiple voice calls or data packet transmissions without changing the subnetwork connections.*

* * * * *